April 11, 1961  F. HÜBL  2,979,255
FLUID OPERATED AUTOMATIC BUSINESS MACHINE
Filed Dec. 9, 1955  13 Sheets-Sheet 1
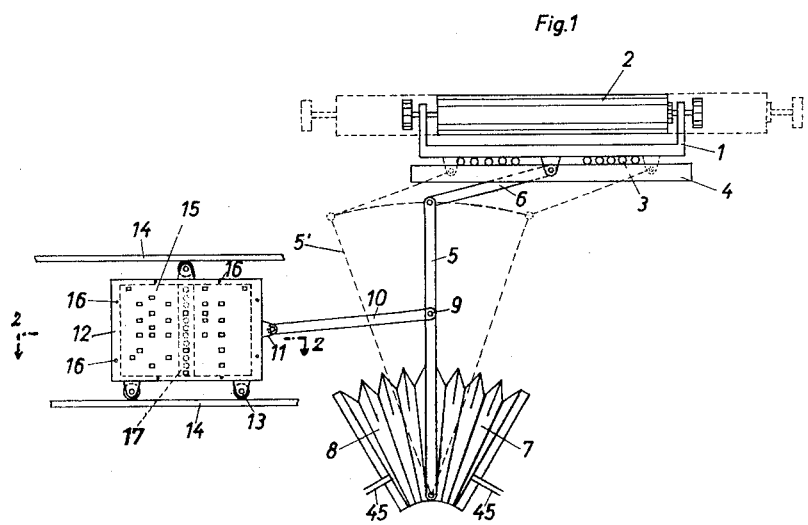
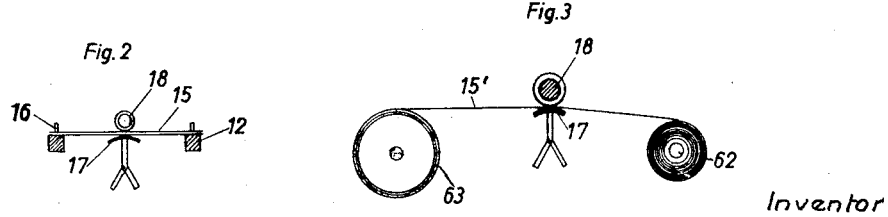
Inventor
Franz Hübl
By Michael S. Striker
a/d.

April 11, 1961 F. HÜBL 2,979,255
FLUID OPERATED AUTOMATIC BUSINESS MACHINE
Filed Dec. 9, 1955 13 Sheets-Sheet 2

Inventor
Franz Hübl
By Michael S. Striker
agt

April 11, 1961   F. HÜBL   2,979,255
FLUID OPERATED AUTOMATIC BUSINESS MACHINE
Filed Dec. 9, 1955   13 Sheets-Sheet 3
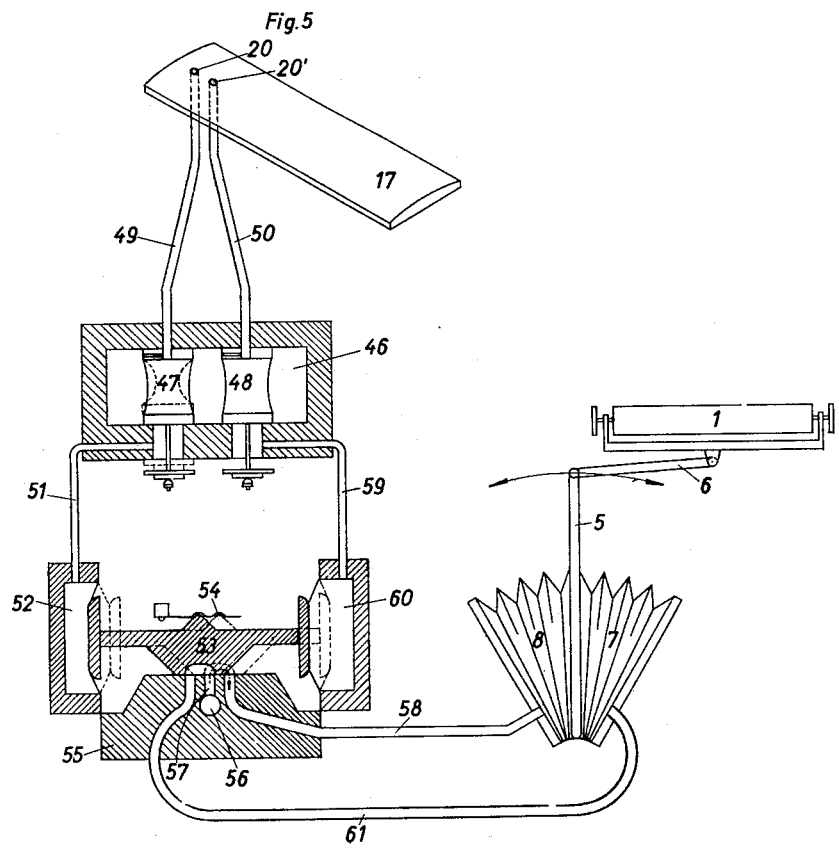
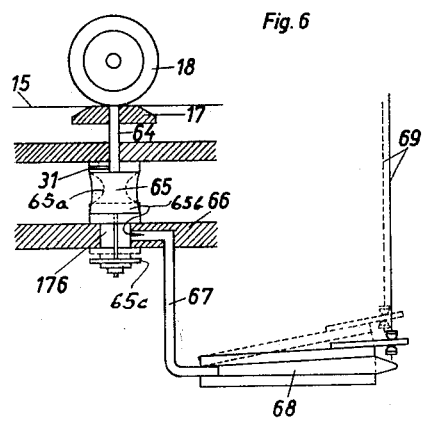
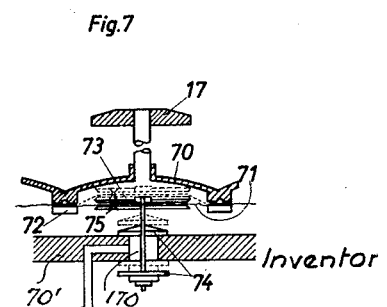
Inventor
Franz Hübl
By Michael S. Striker
agt.

April 11, 1961 F. HÜBL 2,979,255
FLUID OPERATED AUTOMATIC BUSINESS MACHINE
Filed Dec. 9, 1955 13 Sheets-Sheet 4

Inventor
Franz Hübl
By Michael S. Striker
Agt.

April 11, 1961  F. HÜBL  2,979,255
FLUID OPERATED AUTOMATIC BUSINESS MACHINE
Filed Dec. 9, 1955  13 Sheets-Sheet 5

Inventor
Franz Hübl
By Michael S. Strider
agt.

April 11, 1961 F. HÜBL 2,979,255
FLUID OPERATED AUTOMATIC BUSINESS MACHINE
Filed Dec. 9, 1955 13 Sheets-Sheet 7

Inventor
Franz Hübl
by Michael S. Striker
agt.

April 11, 1961  F. HÜBL  2,979,255
FLUID OPERATED AUTOMATIC BUSINESS MACHINE
Filed Dec. 9, 1955  13 Sheets-Sheet 8

Inventor
Franz Hübl
By Michael S. Striker
agt.

April 11, 1961 F. HÜBL 2,979,255
FLUID OPERATED AUTOMATIC BUSINESS MACHINE
Filed Dec. 9, 1955 13 Sheets-Sheet 9

Inventor
Franz Hübl
By Michael S. Striker
agt.

April 11, 1961   F. HÜBL   2,979,255
FLUID OPERATED AUTOMATIC BUSINESS MACHINE
Filed Dec. 9, 1955   13 Sheets-Sheet 10

Inventor

Franz Hübl
By Michael S. Striker
agt.

Inventor
Franz Hübl
By Michael S. Striker
agt.

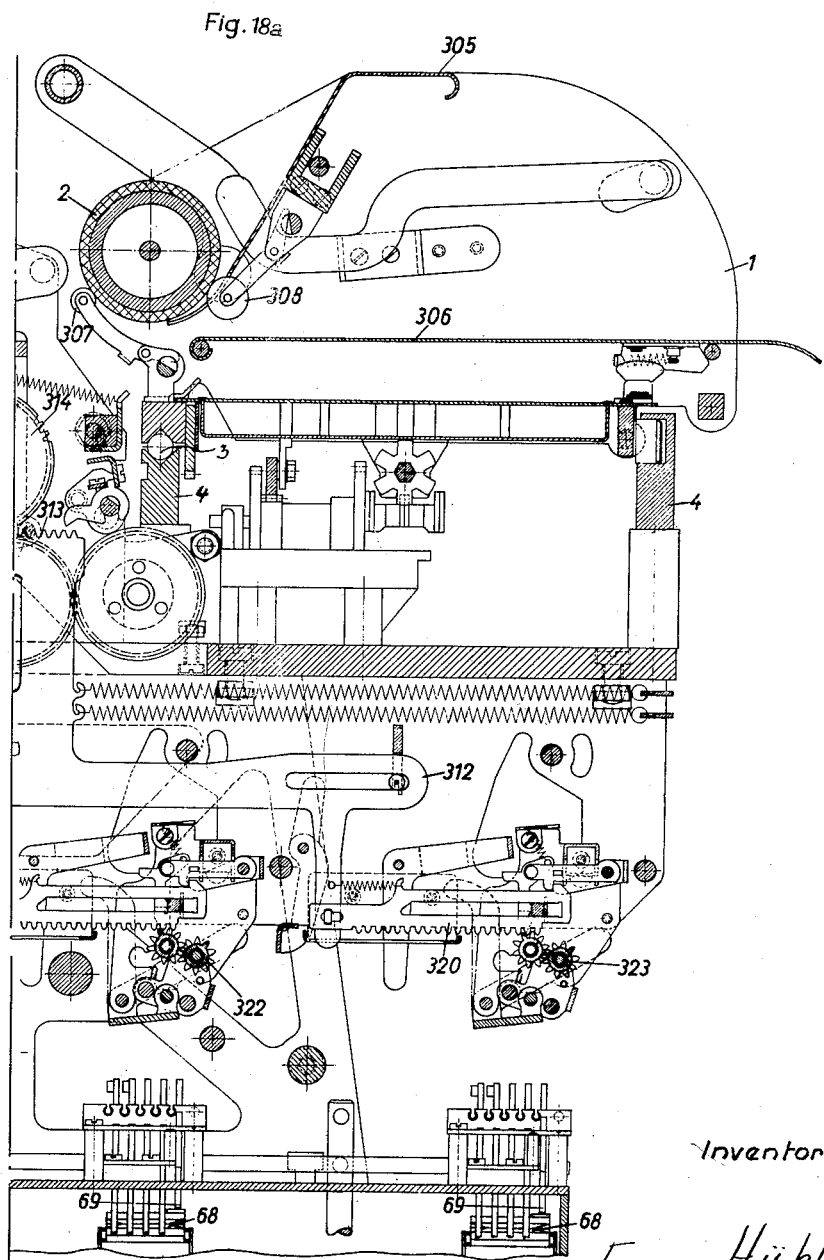

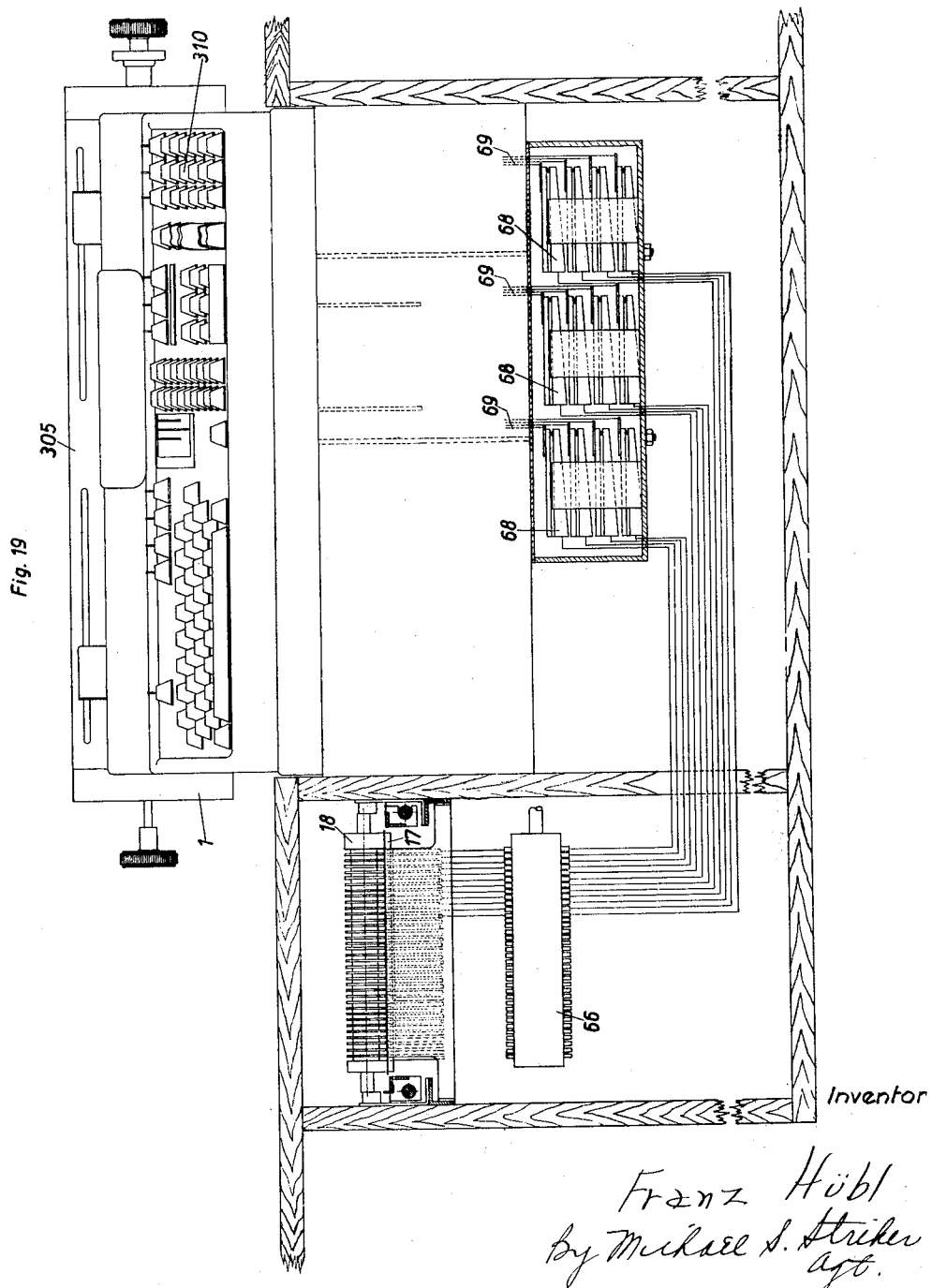

United States Patent Office 2,979,255
Patented Apr. 11, 1961

2,979,255
FLUID OPERATED AUTOMATIC BUSINESS MACHINE
Franz Hübl, Goteborg, Sweden, assignor to Kienzle Apparate G.m.b.H., Villingen, Schwarzwald, Germany
Filed Dec. 9, 1955, Ser. No. 552,206
11 Claims. (Cl. 235—60.47)

The present invention relates to a fluid-operated business machine, and more particularly to a fluid-operated accounting machine including computer means.

It is known to provide mechanical means for controlling the automatic operations in business machines such as accounting machines. The known mechanical control means must be constructed in such manner as to withstand mechanical stress. For instance, in accounting machines of the known art, program control members are arranged on the carriage and control the operations of the machine by actuation of levers. The program control members according to the known art and the levers operated by the same are subject to wear and require complicated transfer mechanisms so that assembly of the machine is expensive and time-consuming. Moreover, the mechanisms which actuate the parts of the machine in accordance with the program control member produce noise, and the exchange of the program control member for another control member corresponding to a different program is difficult and time-consuming so that there is the danger of damage being done to the machine when an unskilled operator attempts to replace a program control member with another program control member. A further disadvantage of the program controlled machines according to the known art resides therein that the operation of the carriage by mechanical means produces disturbing noise.

It is one object of the present invention to overcome the disadvantages of the known program controlled business machines and to provide a program controlled business machine which is operated by fluid-operated means.

It is another object of the present invention to provide a program controlled business machine capable of noiseless operation.

It is a further object of the present invention to provide a business machine of compact construction.

It is a still further object of the present invention to provide a fluid-operated business machine which is controlled by perforated control means controlling conduits for an operating fluid by which various elements of the machine are operated.

It is yet another object of the present invention to provide as program control means a perforated cardboard plate which may be easily exchanged.

It is a still further object of the present invention to provide manually operated means superseding the automatic operation of the machine by opening control conduits for the operating fluids independently of the control plate.

With these objects in view, the present invention mainly consists in a business machine which comprises, in combination, a plurality of movable elements; fluid-operated operating means connected to each of the movable elements for moving the same; a source of fluid having nonatmospheric pressure; operating conduit means for connecting the source of fluid with the fluid-operated operating means; a plurality of control valve means in the operating conduit means, each control valve means being associated with one of the fluid-operated operating means and being movable between a first position for actuating the associated fluid-operated operating means and a second inoperative position; a plurality of fluid-operated actuating means respectively associated with the control valve means for actuating the same; control conduit means for connecting the source of fluid to the fluid-operated actuating means and having a plurality of control conduits open at one end thereof and respectively associated with the actuating means; and movable control means movable between a plurality of positions for opening and closing selected control conduits of the plurality of control conduits in a selected sequence in accordance with a selected program.

The broadest aspect of the present invention consists in the provision of fluid-operated means for actuating movable elements of a business machine.

The operating fluid is preferably air having a pressure higher or lower than atmospheric pressure, but other suitable fluids such as a gaseous medium other than air, or a liquid may be used. In any event, it is only necessary to provide flexible conduits such as hoses which can be easily arranged even within a limited area and take up very little space.

A perforated straight or curved control plate is preferably used and opens and closes the control conduits in accordance with the predetermined program expressed by perforations of the control plate. The control plate is connected to the carriage of the business machine to reciprocate with the same so that all other operations are carried out depending on the carriage position. The conduits according to the present invention are connected to the fluid-operated operating means by which the carriage is moved in such manner that the auxiliary devices are only actuated during movement of the carriage in one direction, whereas during the return movement of the carriage the auxiliary devices such as computor means, line shifting means and tabulating means are not actuated.

Instead of exchangeable control plates associated with different programs by a different arrangement of perforations, a continuous band may be used consisting of connected control portions, each of which has perforations in accordance with a predetermined program.

In addition to the automatic operation of the machine under the control of the control plate, the control conduits are preferably selectively opened and closed by manually-operated valves permitting a control of the operations independently of the automatic operations in accordance with a predetermined program.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic front view illustrating means for reciprocating the carriage;

Fig. 2 is a fragmentary cross-sectional view taken on line 2—2 in Fig. 1;

Fig. 3 is a fragmentary cross-sectional view of a modified embodiment of a program control means according to the present invention;

Fig. 5 is a fragmentary schematic view, partly in section and partly isometric, illustrating a modified embodiment of a program control apparatus for operating the carriage of a business machine;

Fig. 6 is a fragmentary sectional view illustrating a fluid-actuated operating means for a movable element in a business machine;

Fig. 7 is a sectional view illustrating a modified embodiment of a fluid-operated control valve means according to the present invention;

Fig. 18a is the right portion of a cross-sectional view of a business machine according to the present invention and a continuation of Fig. 18; and Fig. 19 is a schematic front view, partly in section, of a fluid-operated control mechanism according to the present invention.

Figure 4:
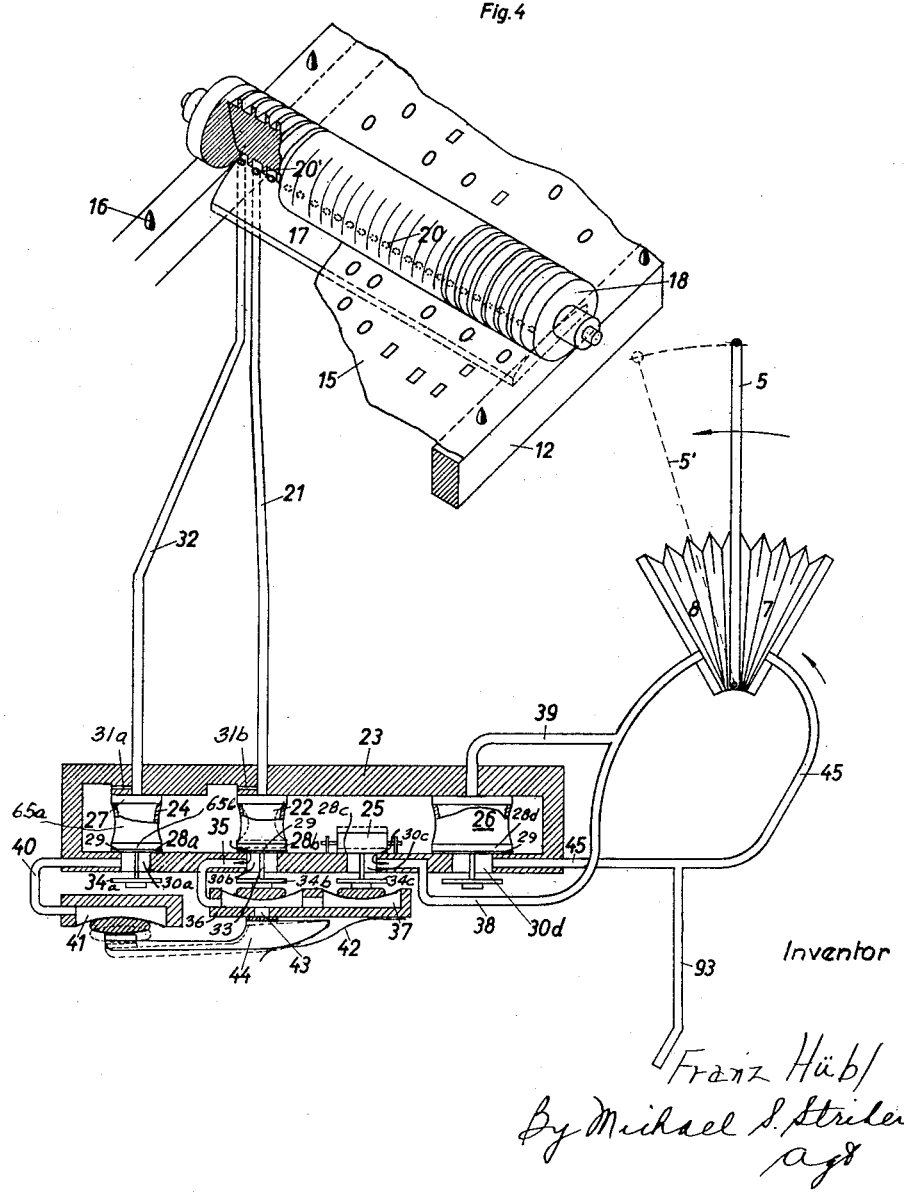
Fig. 4 is a fragmentary schematic view, partly in section and partly isometric, illustrating a program control apparatus according to the present invention for operating the carriage of a business machine.

Referring now to the drawings, and more particularly to Fig. 1, a carriage 1 is mounted for movement on guide rails 4 and rolls on balls 3. The carriage turnably supports a platen 2 which is adapted to support a sheet on which printing is carried out by printing means, not shown in Fig. 1. The carriage can move between two end positions illustrated in broken lines and is moved by fluid-operated operating means in either direction so that the return spring means of the known art are eliminated. The fluid-operated operating means are illustrated in Fig. 1 to be two bellows 7 and 8 which operate a lever 5 to perform a rocking movement between end positions 5'. Lever 5 is connected by a link 6 to the carriage 1. It will be understood that instead of the bellows 7 and 8, other fluid-operated means such as a cylinder and piston mechanism may be used. A connecting rod 10 connects the rocking lever 5 with a pivot joint 11 on a frame 12 which moves on rollers 13 along rails 14 synchronous with the movement of the carriage 1.

*Program control arrangement*

A control plate 15 is mounted on the frame 12 by means of pins 16 which pass through holes in the control plate 15. As best seen in Fig. 2, the reciprocating frame 12 moves the control plate 15 between a supporting pressure roller 18 and a sensing member 17 which slides on the moving control plate 15 during reciprocating movement of the frame 12.

Figure 16:
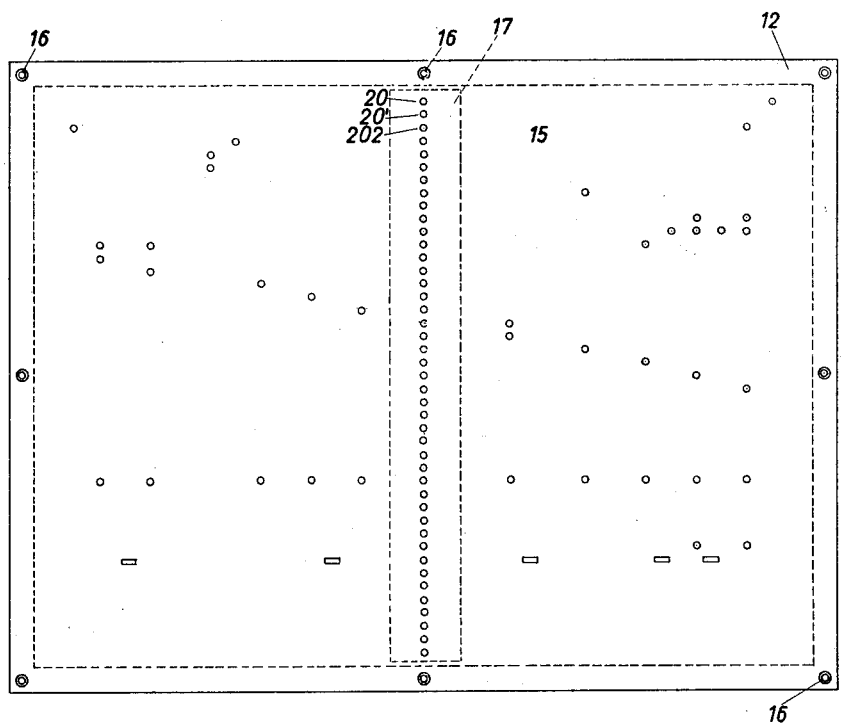
Fig. 16 is a front view of a control plate according to the present invention.

The control plate 15 has perforations which are arranged in rows extending transverse to the direction of movement of the frame 12 and of the control plate 15, so that the sensing member which is provided with a corresponding row of openings 20, 20', 202 consecutively senses the openings provided in each row in the control plate 15. This arrangement is best seen in Figs. 1 and 16 and it will be understood that openings in control plate 15 and in sensing member 17 are superimposed during movement of control plate 15. The perforations of the control plate 15 are arranged in predetermined positions corresponding to a program so that the openings of the control plate 15 and of the sensing member 17 register in a selected sequence. For providing a different program, the control plate 15 is exchanged for another control plate which has perforations arranged in different predetermined and selected positions. In the embodiment shown in Figs. 1 and 2, the control plate is simply lifted off the pins 16, and another control plate is substituted for changing the program.

In the arrangement illustrated in Fig. 3, a series of control plates is combined to form a band 15' which is wound off a reel 62 and onto a take-up reel 63, so that by turning of the reel 63, the desired portion of the band 15' corresponding to a control plate 15 is placed between the sensing member 17 and the pressure roller 18 so as to be sensed during reciprocation of the carriage 1. It will be understood that the reels 62, 63 can be mounted on a frame corresponding to frame 12 so that the desired program carrying portion of the band 15' reciprocates with the carriage means 1 for being sensed by member 17. On the other hand it is possible to rotate the reels 63 and 62 in opposite directions for a limited angle corresponding to the reciprocation of the carriage so that the program carrying portion is moved past sensing means 17.

For moving the carriage 1 to the right corresponding to a return of the carriage, the bellows 8 on the left is inflated by air under pressure, and since there is no spring means provided for moving the carriage to the left, only a small force is required for the operation. For movement of the carriage to the left during printing and computing operations, the bellows 7 on the right side is inflated. The control of the timing of the inflation of the bellows is obtained from the control plate 15 since the conduits 45 communicate with predetermined openings in the sensing member 17 through which pressure fluid can pass to the atmosphere when, in predetermined positions of the carriage, control openings in the control plate 15 register with the respective openings in the sensing member 17.

*Carriage movement*

Fig. 4 illustrates one embodiment of the control arrangement for moving the carriage means in opposite directions. The sensing member 17 is provided with a row of openings 20, each opening being associated with a particular operation of the machine. Fig. 4 shows the function of the first two openings which control the carriage movement. When the rocking lever 5 has arrived in its left end position 5', the control plate 15 has moved into a position with respect to the sensing means 17 in which one of the holes therein registers with the opening 20', the second from the left in Fig. 4, and permits passage of air out of opening 20'. The opening 20' in the sensing member 17 is connected by a control conduit 21 to the valve 22 in a pressure chamber means 23. The pressure chamber means 23 is connected to a source of non-atmospheric pressure, preferably compressed air as will be described hereinafter, so that the pressure therein is different from atmospheric pressure, and is preferably above atmospheric pressure.

Four valves 22, 24, 25 and 26 are arranged in the pressure chamber means 23. The valves 22 and 25 control the carriage movement to the right, and the valves 24 and 26 control the carriage movement to the left. The valves 22 and 24 are respectively associated with the valves 25 and 26 which control the passage of pressure air from the pressure chamber means 23 in to the bellows 7 and 8, respectively. The arrangement is such that the associated valves 22, 25 open when the associated valves 24, 26 close, and vice versa.

Each of the four valves 22, 24, 25 and 26 covers with its bottom face a passage 30a, 30b, 30c, 30d, respectively in the bottom of the pressure chamber means 23 so that the same is completely closed and no pressure air can be discharged from the pressure chamber means 23 in the position illustrated in Fig. 4. The valves 22, 24, 25, 26 include valve members 34a to 34d. Valves 22, 24, 26 include substantially cylindrical hollow bodies having rigid bottom plates 28a, 28b, 28d and top plates 27 and a cylindrical wall consisting of a thin flexible material. Valve 25 has a valve plate 28c. The top plates of valves 24, 22 and 26 have central holes communicating with the conduits 32, 21 and 39, respectively, and are fixedly and air-tightly connected to the wall of the pressure chamber means 23 so that communication between the conduits 32 and 21 and the interior of the pressure chamber means 23 is only possible through narrow conduits 31a, 31b. The bottom plates 28a to 28d are provided with sealing plates 29 consisting of leather or any other suitable sealing material, the sealing plates 29 abutting against the wall of the pressure chamber means 23 and normally closing the passages 30a to 30d since the pressure in the valves 22, 24 and 26 is the same pressure as the pressure prevailing in the pressure chamber means 23. Such inner pressure is produced in valves 22 and 24 by the conduits 31a, 31b, whereas the interior of the valve 26 communicates through conduit 39 with the bellows 8 which is under pressure in the position illustrated in Fig. 4. Valve members 34a to 34d are respectively secured to plates 28a to 28d. The control plate 15 is assumed to close the open ends of the conduits 21 and 32 in Fig. 4 so that no air can pass out of the interior of the valves 22 and 27 in the position illustrated in solid lines in Fig. 4.

When the control plate 15 is moved to a position in which a control opening therein registers with the opening 20' at the end of conduit 21, pressure air escapes through conduit 21 from the interior of valve 22. Since the conduit 31 is narrow, the air passing therethrough cannot sufficiently increase the pressure within valve 22 as long as the conduit 21 is connected to the atmosphere. The pressure within the valve 22 is now lower than the pressure in the pressure chamber means 23 acting on the outer surface of valve 22, and consequently, the thin cylindrical wall of valve 22 is compressed whereby its axial length is reduced and the bottom plate 28b is moved into the retracted position illustrated in broken lines so that the passage 30b is connected to the interior of the pressure chamber means 23. At the same time the valve member 34b which is connected by a rod 33 to the bottom plate 28b, moves upwardly and engages the outer surface of the pressure chamber means 23, closing the passage 30b to the outside so that the air passing into the passage 30b enters the conduit 35 which communicates with two fluid-operated actuating members 36 and 37. Members 36 and 37 have resilient upper walls or membranes which move upwardly when the interior of members 36 and 37 is filled with pressure air through conduit 35. Consequently, the valve member 34b of valve 22 is maintained in its raised position closing passage 30b associated therewith, and the valve member 34c associated with the valve 25 is raised into a position closing the passage 30c, while valve 25 is raised to the position shown in broken lines so that pressure air from the interior of the pressure chamber means 23 passes through conduit 38 into the bellows 8 on the left side of the rocking lever 5, resulting in carriage movement to the right.

A conduit 39 branches off conduit 38 and communicates with the interior of valve 26, as previously described. Consequently, the interior of valve 26 is under pressure when bellows 8 is under pressure, and valve 26 remains in the position closing the passage 30d to prevent communication between passage 30d and the interior of the pressure chamber, but connecting the passage 30d with the atmosphere since the valve member 34d is spaced from the outer surface of the pressure chamber means 23. Consequently, the bellows 7 communicates through conduit 45 and passage 30d with the atmosphere and produces no pressure opposing the carriage movement to the right under the action of bellows 8.

During movement of the carriage to the right, the control plate 15 is moved to the right as well, and the control opening therein moves out of alignment with the open end 20' of conduit 21 in sensing member 17 so that the conduit 21 is closed. Pressure air flows through conduit 31 into the interior of the actuating cylinder of valve 22 and into conduit 21 so that the same pressure is established in the interior of the valve actuating collapsible cylinder as in the pressure chamber means 23. Nevertheless, the valve 22 remains in the position shown in broken lines connecting the conduit 35 with the pressure chamber means 23 since the fluid-operated member 36 exerts a greater force on valve member 34b than the fluid-operated cylinder of valve 22.

The carriage moves to the right until it reaches the desired end position, and in this end position an opening in the control plate 15 registers with the opening 20 in the sensing member 17 communicating with conduit 32. In this position, the air escapes from the collapsible cylinder of the valve 24, and the valve plate 28a is retracted while the valve member 34a is raised, as previously described with reference to valve 22 so that the pressure air passes from the pressure chamber means 23 into conduit 40 and from there to the fluid-operated member 41 and urges the flexible membrane thereof downwardly in the position shown in broken lines in Fig. 4. Thereby, the resilient member 42 moves downwardly into the position shown in broken lines and opens an aperture 43 in the fluid-actuated member 36 by opening a valve plate 44. The pressure prevailing in the interior of the collapsible cylinder of valve 22 moves the bottom plate 28a into a position closing passage 30a since the counterpressure of the fluid-operated member 36 is eliminated. At the same time, valve 25 moves back to the position illustrated in solid lines in Fig. 4 since the counterpressure of member 37 is terminated. Thereby, communication between the bellows 8 and the atmosphere is established through conduit 38, while conduit 38 is disconnected from the pressure air in the pressure chamber means 23 by valve plate 28c. The conduit 39 is also connected to the atmosphere through conduit 38, the pressure in the interior of collapsible cylinder of valve 26 is reduced, and the pressure in pressure chamber means 23 collapses the cylinder of valve 26 so that communication is established between the interior of the pressure chamber means 23 and conduit 45 through passage 30d. The bellows 7 is now under pressure and the lever 5 swings to the left moving the carriage to the left until the same arrives in its left end position in which the conduit 21 is again opened as previously described.

From the above description of Fig. 4, it will be understood that the bellows 7 and 8 constitute fluid-operated operating means or pneumatic operating means for moving the carriage 1, and are connected by operating conduits 45 and 38 through pressure chamber means 23 to a source of non-atmospheric pressure such as a compressor. The control valve means 28a to 28d and 34a to 34d are associated with fluid-operated actuating means 36, 37 which also include the collapsible resilient cylinders of the valves 22, 24 and 26. The control conduits 21 and 32 are opened and closed in a selected sequence in accordance with a selected program determined by perforations in the movable control plate means 15.

Fig. 5 illustrates a modified embodiment of the fluid-operated arrangement according to the present invention for moving the carriage 1. The openings 20, 20' in the sensing member 17 control the reciprocating movement of the carriage in the following manner:

In a pressure chamber means 46 are arranged two valve means 47 and 48 which are constructed in the manner of the valves 24 and 22 in the embodiment of Fig. 4. The control conduits 49, 50 connect the interiors of the collapsible cylinders of valves 47 and 48 with the control openings 20 and 20'. When conduit 49 is opened due to registration of an opening in the control plate 15 with opening 20, the valve 47 moves to the position illustrated in broken lines in which conduit 51 is connected with the pressure air in the pressure chamber means 46 and enters the fluid-operated actuating member 52 whose membrane shifts a slide valve member 53 into the position illustrated in broken lines. A resilient means 54 urges the slide valve member 53 against the valve seat of member 55 which is formed with passages communicating with operating conduits 58 and 61. The duct 56 communicates with a source of compressed air and consequently compressed air passes into operating conduit 58 and into bellows 8 when the slide valve 53 is shifted by the fluid-operated membrane member 52. At the same time, the open end of the passage 61 is uncovered by the slide valve 53 so that the bellows 7 communicates with the atmosphere. The carriage moves to the right until an opening in the control plate 15 arrives in a position registering with the opening 20' at the end of conduit 50 whereby the valve 48 is actuated to permit the passing of pressure air from pressure chamber means 46 in to conduit 59 for actuating the fluid-operated member 60 to shift the slide valve 53 into the position shown in solid lines in Fig. 5 in which the conduit 61 is connected to the source of pressure air and the conduit 58 is connected to the atmosphere. In this position of slide valve member 53, the carriage is moved under the action of bellows 7 to the left in Fig. 5.

The modified embodiment illustrated in Fig. 5 is somewhat simpler than the construction illustrated in Fig. 4 but has the disadvantage that surfaces along which the valve members 53 and 55 are in sliding engagement require lubrication and have to be maintained in perfect mechanical condition to assure an air-tight connection. In contrast thereto, the more complicated arrangement of Fig. 4 uses only valves which close and open in movements perpendicular to the sealing surfaces and avoid a frictional engagement between moving surfaces.

The above described arrangements serve for controlling the carriage movement by means of a control plate preferably consisting of cardboard and provided with a program corresponding to the respective form blank which is to be printed on the carriage during an accounting operation.

Figure 15:
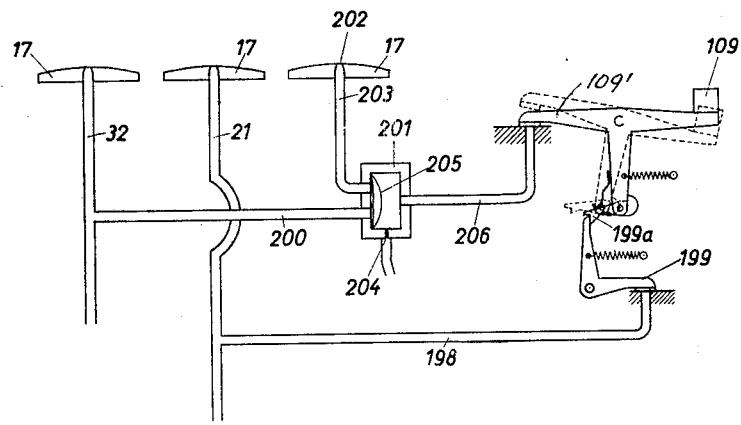
Fig. 15 is a fragmentary schematic view of a mechanism for reversing the movement of the carriage of the business machine.

It is, however, also desirable to control the carriage movement by manual operation for the purpose of returning the carriage to a position in which the printing means are located opposite the first column on the left of the form or in a selected column determined by the program on the control plate 15. The mechanism required for this purpose is illustrated in Fig. 15.

Conduits 198 and 200 are provided which branch off from the conduits 32 and 21 described with reference to Fig. 4. The conduit 198 has an open end normally closed by a valve plate on a pivoted lever 199 under the action of a spring. The conduit 200 is connected to a control conduit 203 through a space in a membrane valve 201 having a membrane 205. Pressure air flows into the membrane valve 201 through a duct 204 and tends to move the membrane 205 into a position interrupting the connection between the conduits 200 and 203. The pressure chamber in the membrane valve 201 is connected to a conduit 206 which is normally closed by a valve plate controlled by a spring loaded lever carrying key 109. A pivoted detent lever 199a is mounted on the lever 109' and engages the end of lever 199. When carriage return key 109 is depressed, the lever 199 is shifted by the detent lever 199a and the conduit 198 opened for a short time only since the detent lever slides off lever 199 which closes under spring action conduit 198 again. At the same time conduit 206 is opened, but before the membrane 205 can establish a connection between conduits 203 and 200, the key 109 can be quickly released whereby the conduit 206 is again closed. The control conduit 21, however, is opened for a short time and the carriage return operation is initiated as described with reference to Fig. 4.

A short depression of the carriage return key 109 will start return movement of the carriage to the right from any column position of the same until an end position is reached in which the printing means are located in the first column on the left side of the ledger sheet on platen 2. In this position a control opening in control plate 15 opens the conduit 32 effecting reversal of the carriage movement. During the short depression of the carriage return key 109, the membrane valve 201, 205 is not effective since it operates with a certain delay.

If, however, the carriage return key 109 is maintained in depressed position opening conduit 206 until the membrane valve 201, 205 establishes the connection between control conduits 203, 200, the above described venting of conduit 21 takes place, but the detent lever 199a slides off the lever 199 which closes immediately conduit 198 so that the conduit 203 becomes effective as soon as the carriage has arrived in a position opposite a selected column in which an opening in the control plate 15 registers with the opening 202 in sensing member 17 associated with the conduit 203. In this desired column position, the return movement of the carriage to the right stops, and a movement of the carriage to the left is initiated. When the return key 109 is again released, the conduit 206 is closed and the pressure air flowing through passage 204 closes the member 205 so that the conduit 203 becomes ineffective.

Due to the above-described arrangement, a short depression of the carriage return key 109 will return the carriage to its end position on the right, whereas a longer depression of the carriage return key 109 will render a control opening in the control plate 15 effective to stop the return movement of the carriage in an intermediate position opposite the column selected by the program on the control plate 15.

*Program control of operations*

The sensing member 17 has in addition to the two openings by which the carriage movement is controlled a series of other openings cooperating with other control conduits by which all other automatic operations required in the machine are controlled. A business machine according to the present invention comprises a plurality of movable elements each of which has to be actuated and shifted in accordance with a predetermined program so that a selected sequence of the operations is obtained. A characteristic operating arrangement for a movable element in the machine according to the present invention is schematically illustrated in Fig. 6. The sensing member 17 is provided with an opening associated with the respective movable element 69, the opening being the open end of a control conduit 64 which communicates with the interior of a collapsible cylinder 65a which constitutes a fluid-operated actuating means for actuating the valve members 65b and 65c of valve means 65. The cylinder 65a is located in a pressure chamber means 66. The valve means 65 operates in the manner described with reference to the valves 22 and 24 in Fig. 4, so that when the pressure in the interior of the fluid-operated actuating cylinder 65a is reduced by opening one end of control conduit 64, communication between the pressure chamber means 66 and the bellows 68 is established through operating conduit 67 and passage 176. The fluid-operated operating means 68, shown to be a bellows, shifts the movable element 69 to operate a lever, a ratchet pawl or a similar movable element. In this manner storage devices, printing devices, line-shifting devices and computing devices are actuated. The movable element 69 is returned to its previous position when the control plate 15 moves into a position in which an unperforated portion thereof closes the open end of control conduit 64. As described with reference to Fig. 1, the control plate 15 is shifted by the carriage so that all other operations of the business machine according to the present invention are controlled in a timed sequence depending on the carriage movement.

The fluid-actuated valves shown in the embodiments of Figs. 4, 5 and 6 may be replaced by modified valves in which the fluid-operated actuating means for the valves are not collapsible cylinders but flat membranes. A valve arrangement of this type is illustrated in Fig. 7, and has the advantage that a plurality of fluid-operated actuating means for a plurality of valves can be combined in a very compact structure. A plate member 70 is provided with a plurality of bulging portions each of which is closed by a membrane 71 which is a portion of a flexible membrane sheet passing over the entire plate member and being secured to ridges of the same by a grid-like member 72. The central portion of each membrane is clamped between two plates 73 to which the movable valve members 74 are attached. The space between the plate member 70 and the wall 70' is a pressure chamber corresponding to the pressure chamber desecribed with reference to the embodiment of Fig. 6. In the wall 70' of the pressure chamber means a passage 170 is provided communicating with the conduit 67. Suitable openings 75 are provided which pass through the plates 73 and the membrane 71 and perform the function of the conduit 31 in Fig. 6. When the pressure in the space between membrane 71 and plate member 70 is reduced by opening the control conduit associated with the sensing member 17, the pressure outside of the membrane raises the membrane 71 which operate the valve member 74 to connect the conduit 67 with the pressure chamber. When the control plate 15 closes the control conduit, the pressure air passing through opening 75 returns the membrane 71 to a position in which the pressure chamber is disconnected from the conduit 67. The combination of a plurality of fluid-operated actuating means in a single plate member permits a particularly compact construction of the machine.

Manual control of operations

It is the essence of the present invention to control operations by opening and closing control conduits. In accordance with the above described arrangements, such control is carried out by a perforated control plate 15 which may be made of cardboard or any other suitable material. However, the control of the operations according to the present invention is also carried out by manual operation of control keys. When the keys are used according to the present invention to control fluid-operated elements, only a very slight key pressure is required.

Figure 8:
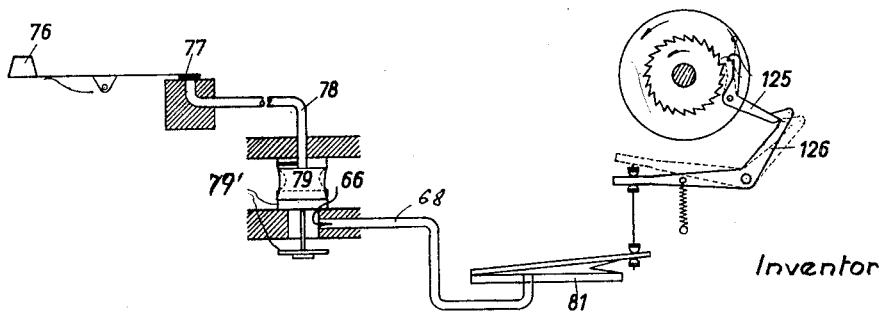
Fig. 8 is a fragmentary side view, partly in section, illustrating the manual control of fluid-actuated operating means according to the present invention.

An arrangement of the present invention in which manually-operated control means are used is shown in Fig. 8. When the key 76 is depressed, the valve plate 77 opens the control conduit 78, and the compressed air escapes from the fluid-operated actuating means of valve 79 so that the valve members 79' connect the operating conduit 68 with the pressure chamber 66 and fluid-operated operating means 81 shift the catch lever 126 into the position shown in broken lines whereby a ratchet pawl 125 is released. It will be understood that any other movable element in the business machine of the present invention can be actuated in the manner shown in Fig. 8 by depression of a key 76.

Operating arrangement

In a business machine it is necessary that during carriage movement in one direction, that is to the left, a plurality of operations are carried out such as printing, tabulating and computing. During movement of the carriage to the right, no operations are required, and consequently in accordance with the present invention the operations recorded on the control plate 15 in the form of openings arranged to determine a program must only be initiated while the control plate 15 moves to the left over the sensing member 17.

Figure 9:
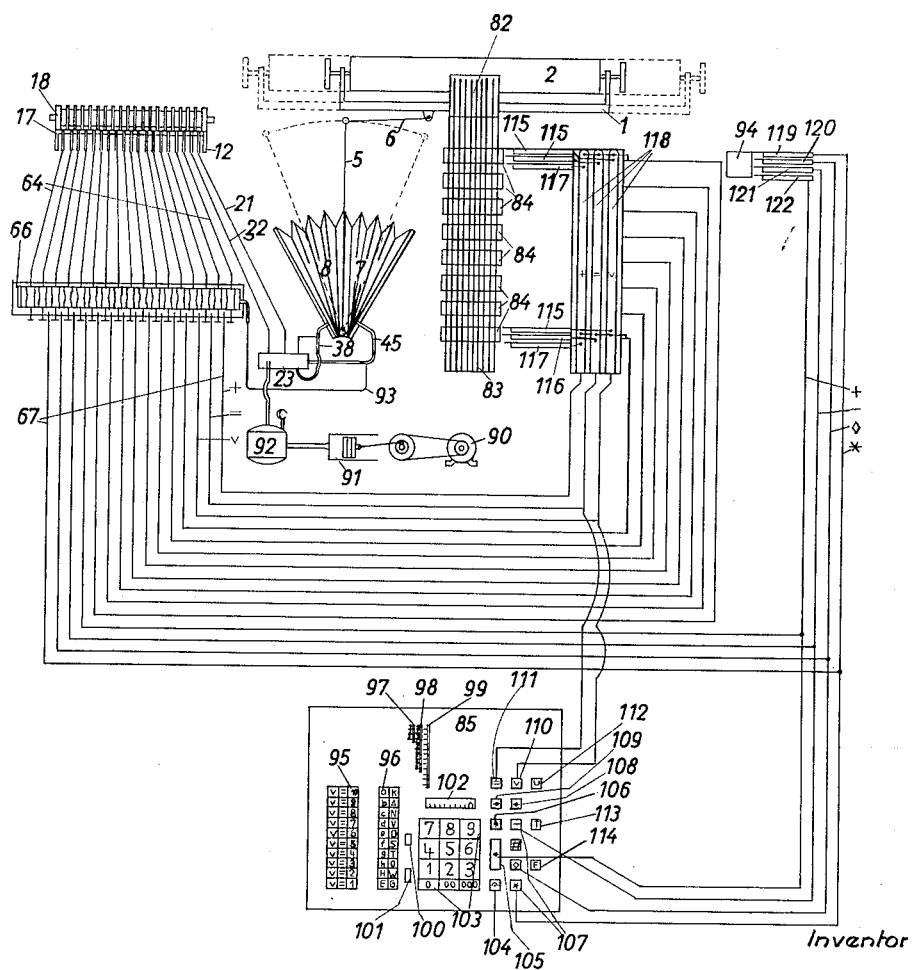
Fig. 9 is a diagram schematically illustrating a business machine according to the present invention.

Consequently, there are two pressure chamber means provided, as best seen in Fig. 9. Pressure chamber means 23 controls the carriage movement through fluid-operated operating means 7 and 8 as shown in Fig. 4, and pressure chamber means 66 controls all other operations performed by the machine. The pressure chamber means 66 is provided with air under pressure through a conduit 93 branching off from the operating conduit 45 which communicates with the bellows 7. Bellows 7 is under pressure only when the carriage moves to the left and consequently the pressure chamber means 66 is under pressure only when the carriage moves to the left so that the operations requiring pressure air from the pressure chamber means 66 are only carried out during the carriage movement to the left since during carriage movement to the right the bellows 7 and consequently the conduits 45 and 93 communicate with the atmosphere so that no pressure is available in the pressure chamber means 66 for operating the fluid-operated operating means. Since during carriage movement to the right there is no pressure in bellows 7, it is necessary that an independent pressure chamber means 23 is provided for controlling the carriage movements.

Referring now to Fig. 9, a carriage 1 carrying the platen 2 is reciprocated between its end positions by fluid-operated operating means 5, 6, 7 and 8 as described with reference to Fig. 1. Type bars 82 are arranged opposite the platen and are provided with rack bars 83. Storage devices 84 are schematically indicated and cooperate with the rack bars 83 in a known manner to move the printing means 82 into printing position. The sensing member 17 is arranged opposite a pressure roller 18, and a control plate is moved between members 17 and 18 as previously described. In the schematic view of Fig. 9, the members 17 and 18 are illustrated turned through an angle of 90° with respect to the carriage 1, and the conduits are shown in single lines for the sake of clarity. The control conduits 21 and 32 connect the associated openings in the sensing member 17 with the pressure chamber means 23 as illustrated in detail in Fig. 4. The other control conduits 64 communicate with the pressure chamber means 66 as described with reference to Fig. 6 and communicate with air ducts 118 leading to fluid-operated operating means for the movable elements of the machine.

A motor 90 drives a compressor 91 which is connected to a pressure vessel 92 having a pressure control means by which substantially constant pressure is maintained. The pressure vessel 92 is connected to the pressure chamber means 23 and constitutes a source of non-atmospheric pressure. As described above, the conduit 93 communicates with the fluid-operated bellows 7 through conduit 45 and is connected to the pressure chamber means 66 so that the same is under pressure only when the carriage moves to the left.

Eight storage devices 84 are illustrated in Fig. 9, but it will be understood that any number of storage devices can be provided when the rack bars 83 are correspondingly designed. A computing device 94 for computing the balance of a ledger sheet A is shown in the right-hand upper corner of Fig. 9. Additional computing devices for carrying out additions or subtractions on lines on the ledger sheet may be provided. The operation of the computing means is known and not an object of the present invention. Similarly, the operation of the storage devices 84 is known and these storage devices may be arranged for carrying out additions of column entries or of line entries. The totalizers, storage devices and computing devices may be constructed to perform only adding operations, adding and subtracting operations, or balancing operations. In the arrangement shown in Fig. 9, the storage devices 84 include totalizers for performing additions, and the computer device 94 is provided for computing the balance of the sheet along a line of the sheet.

The keyboard 85 has on the left a set of keys 95 for actuating the storage devices and totalizers 84. The set of keys 96 controls type levers for printing characters and symbols, and three levers 97, 98 anad 99 are provided for presetting the date.

The keyboard of the machine further comprises a key 100 for preventing the automatic motor operation, a clearing key 101, a decimal point key 102, number keys 103 including keys for 0, 00, 000 and for the digits from 1 to 9, a space key 104, a key 105 for coupling the drive shaft of the machine to the motor, a line shifting key 106, four control keys for the computer device 94 for initiating addition, formation of an intermediate sum, non-addition and subtraction 107, a tabulating key 108, a back-space key 109, register keys 110 and 111, an operation reversing key 112 for computing means capable of carrying out additions and subtractions, and a key 114 for holding the carriage. The key 112 may also be used for releasing the storage devices for forming a sum. The devices operated by the above-described keys will be described hereinafter.

The machine is provided with a main drive shaft which is driven from motor 90 through coupling means and performs single revolutions in a known manner to effect an operation of the computing devices as will be described hereinafter. Selected totalizers are operated by actuation of coupling means for storing a number or for forming of a sum or intermediate sum.

Each storing device 84 is associated with three fluid-operated operating means which are schematically indicated for the uppermost and lowermost storage devices in Fig. 9 and serve for forming an intermediate sum, a total, and for storing an entry. The three fluid-operated operating means 115, 116 and 117 are bellows or hydraulic servo-motors connected to the air ducts 118. All bellows 115 are connected to a duct 118 associated with an intermediate sum, all bellows 116 are connected to an air duct 118 associated with a total, and all bellows 117 are connected to an air duct 118 associated with entries. The ducts 118 are supplied with air under pressure through the control plate 15 and the sensing member 17, pressure chamber means 66, and operating conduits 67.

At the same time, a selected storage device 84 is actuated through one of the other operating conduits 67 by registration of an opening in control plate 15 with an opening in the sensing member 17. The other storage devices which are preset for the same operation by pressure air passing through the air ducts 118 are not actuated.

The computer device 94 is connected to four fluid-operated operating means. The bellows 119 effects addition, the bellows 112 effects subtraction, the bellows 121 effects the formation of an intermediate sum, and the bellows 122 effects the formation of a total. During jumping of the carriage from one column position to the next column position which is effected by tabulating means, the control plate 15 slides correspondingly over the sensing member 17 so that the openings register in accordance with a predetermined program to initiate all desired operations.

Figure 10:
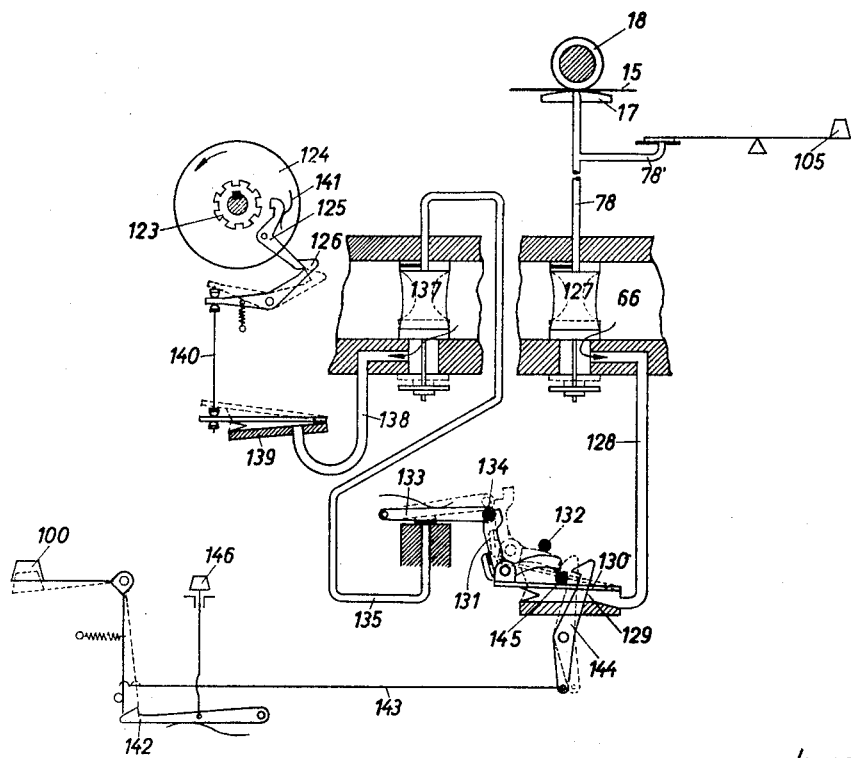
Fig. 10 is a side view, partly in section, illustrating a detail of the operating means according to the present invention.

Fig. 10 shows a coupling means 123 which is continuously rotated by the motor 90. For control of the operation, a coupling pawl 125 is pivotally mounted on a disc 124 which is connected to the main drive shaft of the machine for rotation therewith. Coupling pawl 125 is held in releasing position by the catch lever 126 and tends to assume a coupling position under the action of spring 141. When an opening in the control plate 15 registers with an opening in the sensing member 17 in accordance with the program, an operation is initiated. The valve 127 is actuated as previously described, and permits passing of pressure air from the pressure chamber means 66 through operating conduit 128 into the bellows 129. The movable part 130 of the bellows 129 carries a pivoted detent lever 131 which engages a pin 134 on a spring-loaded valve member 133. When the bellows 129 is raised, the detent lever 131 is also raised and pivots the spring-loaded valve member 133 into the position illustrated in broken lines thereby opening the conduit 135. When the detent lever 131 engages in raised position the stop 132, it is pivoted in clockwise direction so that it releases the pin 134 of the valve member 133 which assumes again a position closing conduit 135. Consequently, the valve member 133 is opened only for a short time during which pressure air passes through the conduit 138 since the valve 137 opens when the pressure in the fluid-operated cylinder thereof is decreased due to the opening of conduit 135. The pressure air passing through conduit 138 operates the bellows 139 to raise the movable element 140 which moves the detent lever 126 into the position shown in broken lines whereby the coupling lever 125 is released and engages the coupling member 123.

In this position, the disc 124 is taken along by the coupling member 123 which continuously rotates with the motor driven drive shaft on which it is mounted. After one revolution of the disc 124 and of the main drive shaft of the machine, the coupling lever 125 returns to the position shown in Fig. 10 and is again engaged by the catch lever 126 since in the meantime the valve 137 has closed again connecting the conduit 138 with the atmosphere. As described above, the valve 137 is operated only for a short time since the valve member 133 opens only for a short time. The arrangement shown in Fig. 10 consequently obtains by the fluid-operated means according to the present invention the turning of disc 124 and of the main drive shaft connected thereto through a single revolution which is necessary for performing certain computing and storing operations in known storing devices.

As shown in Fig. 10, the coupling mechanism can also be operated by manual operation of a key 105. When the coupling key 105 is actuated, the conduit 78' is opened and permits escape of air from the fluid-operated actuating means of valve 127 so that the same operation takes place as if the conduit 78 would be opened by a perforation in the control plate 15. When the key 100 is depressed, it is retained in depressed position by the catch lever 142. A connecting rod 143 is shifted when key 100 is depressed and pivots the detent lever 144 into the position shown in broken lines in which it engages a pin 145 secured to the movable member 130 of the bellows 129. In this position of the detent lever 144, the bellows 129 cannot actuate the lever 131 and consequently no coupling between the disc 124 and the drive shaft carrying the coupling member 123 can take place. As long as key 100 remains depressed, the control impulses initiated by the control plate 15 are ineffective and the respective programmed operations do not take place. Key 100 can be released by depressing the button 146 by which the catch lever 142 is moved into a position releasing the key 100 which returns to its normal position under the action of a spring.

*Tabulating mechanism*

Figure 11:
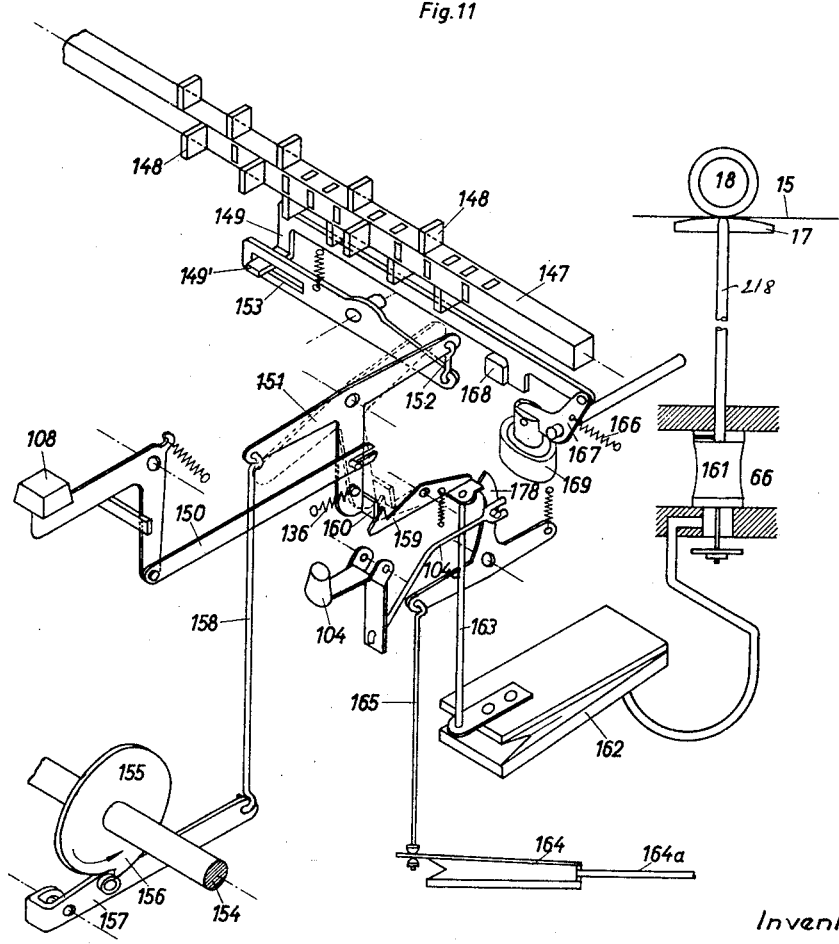
Fig. 11 is a partly isometric and partly sectional view illustrating tabulating mechanism according to the present invention.

Referring now to Fig. 11, a prismatic bar 147 is mounted on the carriage and carries shiftable stops 148 which can be rearranged on the bar 147 in accordance with the ledger sheet form which is to be printed. When a different kind of accounting operation is to be performed, the control plate 15 is exchanged, and the prismatic bar 147, which may have a rectangular or polygonal cross-section, is turned so that a set of stops 148 corresponding to the columns of the respective ledger sheet becomes operated. The carriage is stopped when the stop lever 149 engages one of the stops 148. If the tabulating is to be carried out by a manual operation, the tabulating key 108 is depressed so that the rod 150 pivots the three-armed lever 151 into the position shown in broken lines in Fig. 11. Lever 151 is connected by a link 152 to a pivoted intermediate lever 153 which embraces a transversely projecting portion of the stop lever 149 in a slot. When the lever 151 is pivoted, the stop lever 149 releases the respective stop 148, and the carriage is released for movement to the left.

The main drive shaft 154 of the machine which is turned through a single revolution when the coupling means shown in Fig. 10 is actuated, carries the tabulating cam means 155 and turns the same in the direction of the arrow. Shortly before the cam means 155 arrives in the position illustrated in Fig. 11, the cam lug 156 engages a cam follower on lever 157 so that the lever 157 is pivoted and turns the three-armed lever 151 so that the stop lever 149 is automatically released corresponding to the release effected by operation of the tabulator key 108.

For certain bookkeeping operations, it is desirable that the carriage does not jump from one column to the adjacent column, but skips over one or several columns to jump directly from one column to another column which is not adjacent thereto. The skipping key 104 is provided for this purpose. When key 104 is depressed, the guide arm 104a pivots a detent means 178 in clockwise direction so that a detent lever 159 is released and pivots under the action of a spring into the position shown in broken lines in Fig. 11. The three-armed lever 151 is provided with a lateral projection 160 cooperating with the detent lever 159. When the detent lever is in its normal position, the hooked end of the detent lever 159 is located below the projection 160 and is inoperative. When the detent means 178 is pivoted by operation of key 104, the hooked end of the detent lever 159 is raised and located in the path of the transverse projection 160. Consequently, when lever 151 is pivoted into the position shown in broken lines, the transverse projection 160 passes behind the hooked end of the detent lever 159 and is retained by the same so that the lever 151 and the stop lever 149 are retained in a releasing position. Consequently, the stop lever 149 cannot engage the next following stop member 148 which is associated with the adjacent column of the ledger sheet, but skips in the respective column or columns until the detent means 159 again releases the projection 160.

Such release is initiated by a suitable perforation in the control plate 15 which effects actuation of a valve 161 through conduit 218 so that the fluid-operated operating means 162 is operated and returns detent means 178 to its normal position urging the detent means 159 into a position releasing the transverse projection 160 on lever 151. The detent means 159 is held by the detent lever 178 in its inoperative position illustrated in solid lines in Fig. 11 as long as no skipping of columns but a carriage movement from column to column is desired. As pointed out above, such tabulating movement from column to column is automatically obtained by cam means 155.

The detent lever 178 may also be operated from the control plate according to a program, for instance if an automatic selection of the column in which the balance is to be taken is desired. In this event pressure air is supplied through the conduit 164a to the bellows 164 by valve means of the type shown in Fig. 6, and the actuated bellows 164 moves the link 165 to pivot the detent lever 178 as previously described with reference to the operation of the key 104.

Fig. 11 also shows a known arrangement for braking the carriage during a tabulating jump. When the stop lever 149 is pivoted to a releasing position releasing a stop 148, the tension spring 166 becomes effective to retract the stop lever 149 through lever 167 in a direction opposite to the direction of the carriage movement during tabulating operation. When stop lever 149 returns to its operative position and engages the next following stop member 148, it is taken along by the carriage until it engages a fixed stop 168, while the air brake 169 brakes the carriage movement.

*Control of the storage devices*

Figure 12:
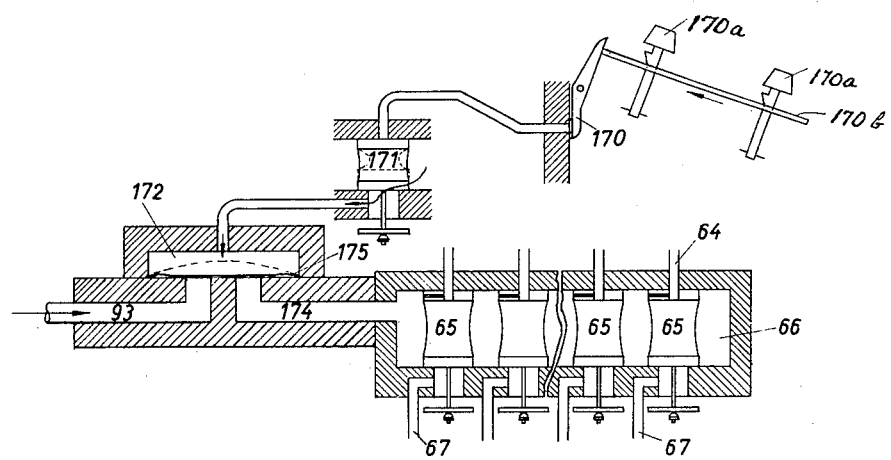
Fig. 12 is a fragmentary sectional view of a detail illustrating a mechanism for controlling storage devices.

Fig. 12 schematically illustrates an arrangement according to the present invention for actuating and inactivating selected storing devices. A control opening for each storing device is provided in the sensing member 17. A control conduit 64 connects the respective opening with a fluid operated control valve means 65 in the pressure chamber means 66. When an opening in the control plate 15 registers with the respective opening in the sensing member 17, the respective associated valve means 65 is actuated and effects through the respective associated operating conduit 67 the operation of the associated fluid-operated operating means 68 as described with reference to Fig. 6.

If the actuation of another storing device is desired which is not on the program of the control plate 15, a selector key 170a is depressed. The selector keys 170a shift a slide 170b in the direction of the arrow whereby the valve member 170 is pivoted in counterclockwise direction and opens a conduit leading to the control valve 171 so that the same is actuated and permits the passing of pressure air into the fluid-operated actuating means 172. When pressure air enters member 172, its flexible membrane 175 closes the conduits 93 and 174 which are normally connected. Conduit 174 communicates with the pressure chamber means 66, and conduit 93 communicates through conduit 45 with the bellows 7 as described with reference to Fig. 4. As long as pressure air is supplied from conduit 93 during movement of the carriage in one direction to the pressure chamber means 66 the valve 65 can be actuated by opening of the control conduits 64 by the control plate 15. When the fluid-operated member 172 interrupts the connection between the pressure conduit 93 and the pressure chamber 66 which is effected by depression of a key 168, the flow of pressure air to pressure chamber means 66 is interrupted and the program control is superseded so that the storing devices are not automatically actuated. Any storing device can then be selected by a manually-operated key in a known manner not illustrated in Fig. 12.

In certain bookkeeping transactions it is not only necessary that the carriage jumps from column to column, skips a column or columns, or returns upon actuation of return key to a desired column position but it is also necessary or desirable that the carriage moves left and right in accordance with a program stopping in each column or skipping columns as required by the conditions. Such carriage motions may be required for producing a copy of a printed text in original print, or for copying in original print on a separate sheet of paper entries selected from the ledger sheet.

Figure 17:
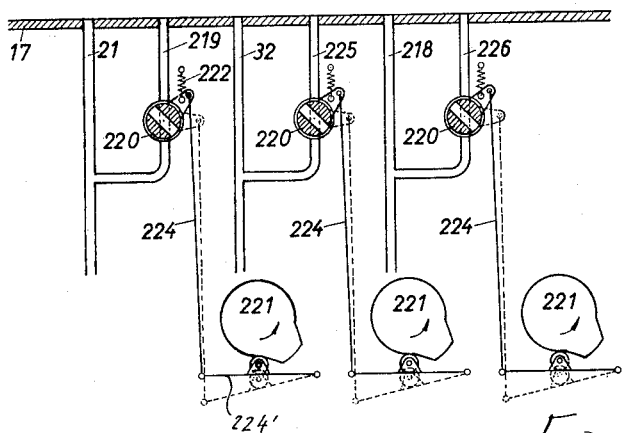
Fig. 17 is a fragmentary schematic view, partly in section, illustrating a control device for controlling the carriage movement in accordance with a program.

A mechanism for obtaining such carriage movement in opposite directions in accordance with the program, is schematically illustrated in Fig. 17. The control conduits 21 and 32, described with reference to Fig. 4, open on the sensing member 17, the control conduit 21 serving for initiating a carriage movement from the left to the right, and the control conduit 32 serving for initiating a carriage movement from the right to the left in the carriage end portions. The conduit 218 is the control conduit for effecting column skipping by the carriage as described with reference to Fig. 11. A branch conduit 219 is connected to conduit 21, a branch conduit 225 is connected to conduit 32, and a branch conduit 226 is connected to conduit 218, the conduits 219, 225 and 226 ending in control openings on the sensing member 17. Valves 220 are provided in each of the branch conduits and close valves 220 under the action of springs 222 so that the branch conduits have normally no effect. Each valve 220 is connected by connecting rod 224 to a pivoted cam follower lever 224' which is actuated by a cam 221. When the cams 221 are rotated, they move the associated valves 220 to an open position in which the conduits 21, 32, and 218, respectively, are connected to the atmosphere when a control opening on the control plate 15 opens one of the conduits 219, 225 and 226.

Opening of conduit 219 will have the same effect as if conduit 21 would have been opened, and results in movement of the carriage from the left to the right, whereas conduit 225 will move the carriage from the right to the left and conduit 226 will effect skipping of a column in accordance with the program on control plate 15. Due to the arrangement shown in Fig. 15, the carriage can be operated to move between selected variable end positions in each line, whereas the arrangement shown in Fig. 4 effects a carriage movement between two predetermined extreme end positions of the carriage.

Line shifting mechanism

Figure 13:
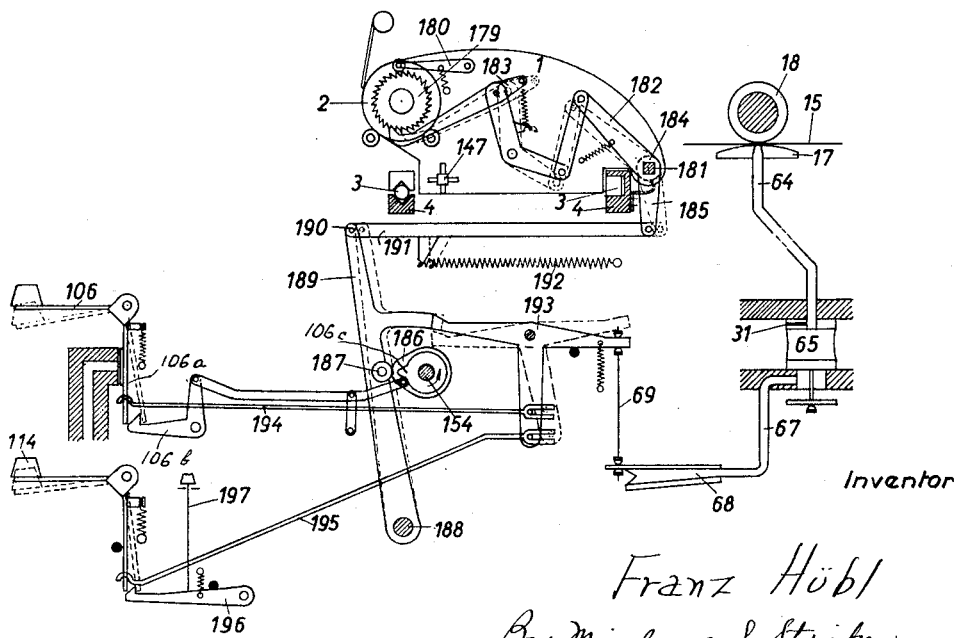
Fig. 13 is a fragmentary side view, partly in section, illustrating a line-shifting mechanism for shifting the platen of the machine.

Fig. 13 illustrates an arrangement according to the present invention for turning the platen in a line shifting operation. The operation is carried out by a mechanism operated by the main drive shaft 154, and can be initiated either by manual operation of key 106, or by the control plate 15 according to the predetermined program. A line shifting ratchet wheel 179 is mounted on the shaft of the platen 2 and is engaged by a spring loaded pawl 180 provided with a roller at the end thereof. A prismatic bar 181 is mounted in the lateral walls of the carriage 1 for turning movement and carries a spring loaded lever 182. A shifting ratchet pawl 183 cooperates with the ratchet wheel 179 and is connected by a set of linking levers to the lever 182 so that turning of the bar 181 results in turning of the platen. The prismatic bar 181 slides during the carriage movement in a guide sleeve 184 which is mounted on the rails 4 for turning movement and can be turned by operation of lever 185. Due to this arrangement, it is possible to carry out a line shifting operation in any displaced position of the carriage although the operating mechanism is stationarily mounted on the supporting frame which carries the rails 4 along which the carriage 1 rolls on balls 3.

The main drive shaft 154 supports the line shifting cam 186 which cooperates with a cam follower roller 187 mounted on the lever 189. Lever 189 is supported by pivot pin 188 and pivotally connected at its other end by pin 190 to the connecting rod 191, the other end of which is pivotally connected to lever 185 by which bar 18 is turned.

The spring 192 is connected at one end to the stationary frame of the machine and at the other end to the connecting rod 191 so that the lever system 189, 191, 185 tends to assume a position in which the cam follower roller 187 engages the line shifting cam 186. In this position, the platen can be shifted once during each revolution of the main drive shaft 154. However, the lever 189 is prevented from moving into its operative position when the three-armed blocking lever 193 is in the position illustrated in solid lines in Fig. 13. When the lever 193 is pivoted to the position illustrated in broken lines in Fig. 13, the lever 189 is released and is free to move under the action of spring 192 into the position shown in broken lines in Fig. 13 in which automatic line shifting takes place during each revolution of the main drive shaft 154.

The blocking lever 193 can be turned to its releasing position either by manual operation of the line shifting key 106, or by an automatic operation initiated by the program carrying control plate 15.

The line shifting key 106 carries a lever arm 106a which is connected to a link 194 which engages a pin on the blocking lever 193 so that depression of key 106 results in turning of the blocking lever 193. The line shifting key 106 is retained in depressed position by a detent lever 106b which is automatically released by a cam 106c when the line shifting operation has been completed under control of cam 186.

In the automatic operation, the sensing member 17 has a control opening registering with a control opening in the control plate 15 when the carriage arrives in a position in which line shifting is required. Thereupon, the valve 65 is actuated, and pressure air flows into the fluid-operated operating means 68 which is connected by a link 69 to the blocking lever 193 and pivots the same into releasing position. After release of blocking lever 193, the main drive shaft automatically carries out the line shifting operation. A line shifting operation is also initiated by the carriage holding key 114 which shifts through a connecting rod 195 the blocking lever 193 in the same manner as described with reference to key 106. The carriage holding key 114 is retained in depressed position by a detent means 196 and can be released by depression of the releasing key 197.

Figure 14:
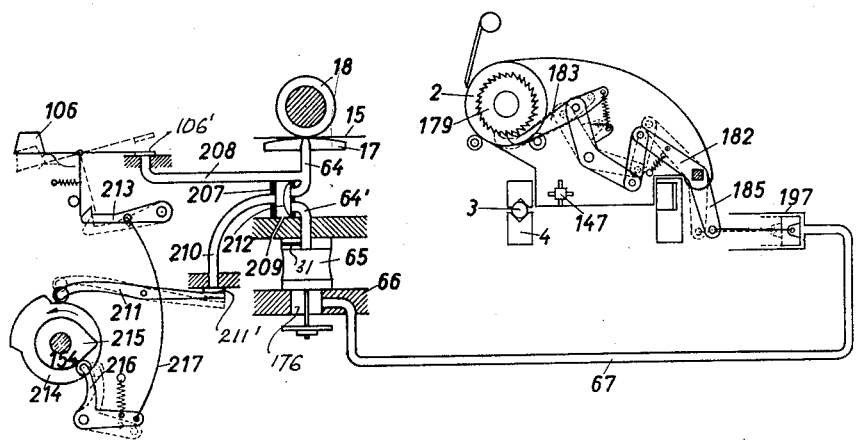
Fig. 14 is a fragmentary sectional view illustrating a modified embodiment of a line-shifting arrangement according to the present invention.

In a modified arrangement according to the present invention the force for shifting the platen to the next line is not derived from the main drive shaft of the machine but from fluid-operated operating means. Fig. 14 illustrates an arrangement of this type in which a cylinder and piston means 197 is provided for shifting the lever system 185, 182 through which the line shifting pawl 183 is actuated to shift the ratchet wheel 179 for turning the platen. The cylinder of the fluid-operated operating means 197 is connected by an operating conduit 67 to the opening 176 in the wall of the pressure chamber means 66. As previously described, actuation of the fluid-operated valve means 65 will result in flow of pressure air from the pressure chamber means 66 to the operating means 197 whereby a line shifting operation is obtained. The control valve 65 is actuated either by manual operation of the line shifting key 106, or under the control of the control plate 15.

It is necessary that the line shifting operation take place after a number has been printed. However, the line shifting operation is preset at the moment in which the openings in the sensing member 17 and in the control plate 15 register which takes place when the carriage jumps to the respective new column due to a tabulating operation. In order to postpone the line shifting until a number has been printed in the new column, the arrangement illustrated in the left portion of Fig. 14 is provided.

The control conduit 64 which is connected to the control opening in the sensing member 17 communicates with control conduit 64' through a passage in a membrane valve 207 which can be opened and closed by operation of the membrane 212. The membrane valve 207 receives pressure air from pressure chamber means 66 through a conduit 209 so that the membrane is in a position closing the conduits 64 and 64' as long as the valve plate 211' closes the conduit 210. When the lever 211 is pivoted into the position shown in broken lines, the conduit 210 is opened and the membrane assumes the position illustrated in Fig. 14 in which the control conduits 64' and 64 are connected so that valve 65 is actuated and the line shifting mechanism operated. This fluid-control mechanism is operated regardless of whether the control conduit is opened by the control plate 15 or by the valve member 196' which is controlled by the line shifting key 106. When the line shifting key 106 is depressed, the detent lever 213 engages an arm fixedly connected to key 106 and holds key 106 in the position illustrated in broken lines until it is moved to a releasing position which is effected by the cam 215 on the main drive shaft 154 which near the end of a single revolution of the main drive shaft pivots the lever 216 into a position in which the connecting link 217 releases the detent lever 213.

In the automatic operation controlled by the control plate 15, the valve plate 211' is held by resilient means, not shown, in closed position, until the cam 214 on the main drive shaft 154 pivots lever 211 into the position shown in broken lines. Shortly before the main drive shaft 154 has completed a single revolution, the cam 214 permits return of lever 211 into a position in which the valve plate 211' closes conduit 210 whereupon pressure air flowing through channel 209 interrupts the connection between control conduits 64 and 64' so that valve 65 closes under the action of duct 31 whereby the pressure air is permitted to escape from operating conduit 67.

Figure 18:
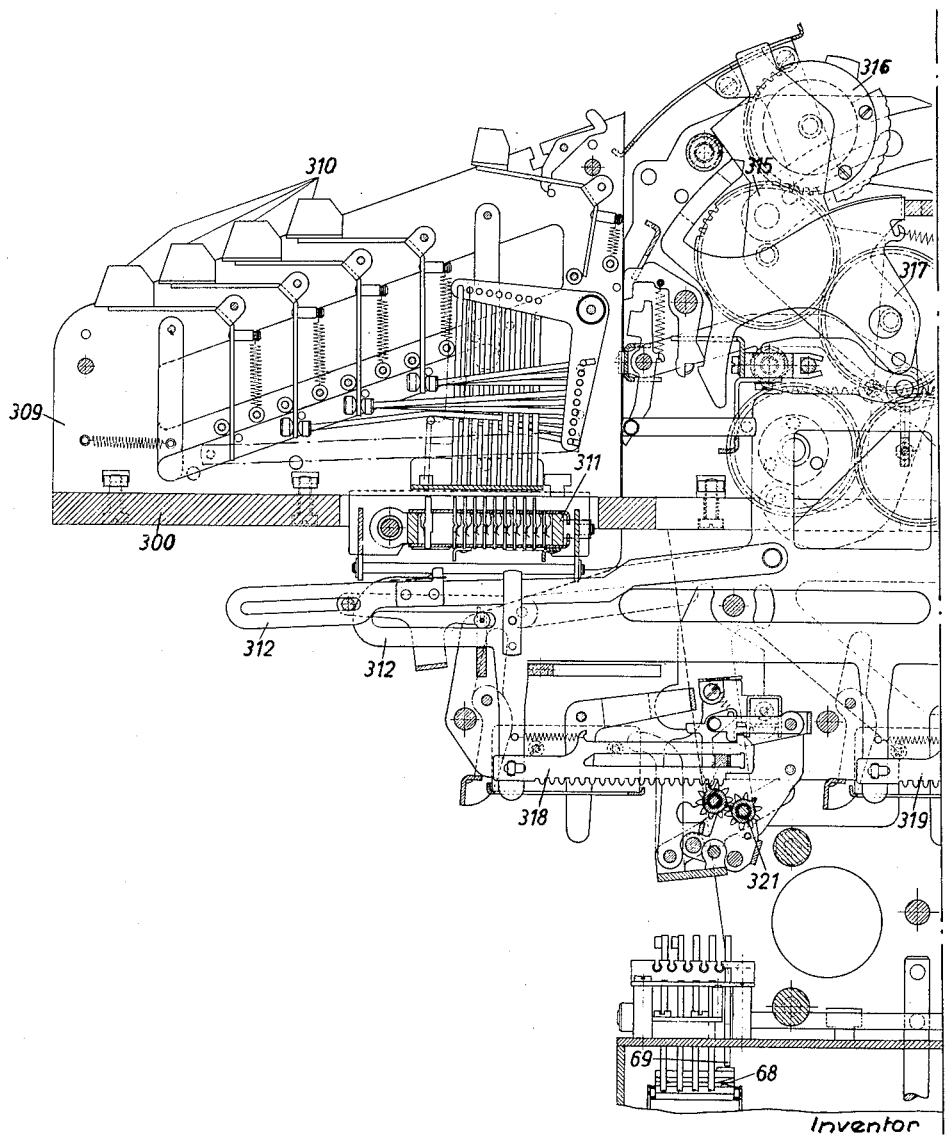
Fig. 18 is the left portion of a cross-sectional view of a business machine according to the present invention.

Figs. 18, 18a and 19 illustrate a business machine according to the present invention. Parts of the machine which are immaterial for the operation, are omitted for the sake of clarity.

The machine has a base plate 300 on which the rails 4 are mounted on which the carriage 1 moves on balls 3. Sheets of paper, such as ledger form blanks, are guided by the paper guide means 305 and 306 to the platen 2. Pressure rollers 307 and 308 press the sheet against the platen.

A keyboard 309 is arranged on the front part of the base plate and includes the keys 310. By depression of the keys 310, values are introduced into the longitudinally movable register carriage 311. Numerical values introduced into the register carriage 311 are sensed by sensing elements 312 which are advanced and retracted during each operation. The sensing elements 312 are connected to rack bars 313 which transfer numerical values through intermediate gears 314 and 315 to the type wheels 316 of the printing means. The carrier 317 of the type wheels is turned in clockwise direction for performing a printing operation and thereby prints the values registered on the type wheels 316 on a sheet held on the platen 2. The sensing element 312 are further connected to three rack bars 318, 319 and 320 of the totalizer mechanism which transfer the values introduced into the register carriage 311 to the number wheels of one of the three totalizer devices 321, 322 and 323. Each totalizer device 321, 322 and 323 consists in a known manner of two sets of counting wheels respectively provided for addition and subtraction. The storing devices are not illustrated in Figs. 18 and 19 since they are arranged behind the computer devices and not an object of the present invention.

The control of the totalizer operation is carried out by fluid-operated means in accordance with the present invention. The control mechanism for this purpose is schematically shown in Fig. 9 and is arranged laterally of the machine as shown in Fig. 19. Fig. 19 shows the sensing member 17 and the counterpressure roller 18 between which the control plate 15 moves as described in detail with reference to Fig. 1. Fig. 19 also shows the pressure chamber means 66, the operation of which has been described with reference to Fig. 9. The pressure chamber means 66 is connected by operating conduits to the fluid-operated operating means 68 shown to be bellows in Fig. 19 which operate movable elements 69 by which the required operations are carried out. The positions of movable elements 69 associated with the computing mechanism and storage devices is transferred by mechanical sensing elements to the computing and storage devices for effecting the computing operation initiated by the control plate 15 such as additions and subtractions, formation of totals and of intermediate sums. The mechanical sensing elements are not illustrated in the drawings since they are known and not an object of the present invention.

It will be understood that each of the elements described above, or two or more together, may also find a useful application in other types of business machines differing from the types described above.

While the invention has been illustrated and described as embodied in a business machine including a plurality of movable elements operated by fluid-actuated means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an accounting machine, in combination, a plurality of movable elements, one of said movable elements being a carriage means adapted to cooperate with printing means and the other movable elements being adapted to actuate movable parts of the machine for effecting actuation of computing means and storage means; fluid-operated operating means connected to each of said movable elements for moving the same; a source of fluid having non-atmospheric pressure; operating conduit means for connecting said source of fluid with said fluid-operated operating means and comprising a plurality of operating conduits respectively connected with said fluid-operated operating means; a plurality of control valve means in said operating conduits, respectively, each control valve means being movable between a first position connecting said source of fluid with the respective operating conduit and a second position connecting the respective operating conduit and the respective fluid-operated operating means with the atmosphere; a plurality of fluid-operated actuating means respectively operatively connected with said control valve means for actuating the same; control conduit means including ducts for connecting the source of fluid for movement therewith with said fluid-operated actuating means and a plurality of control conduits open at one end thereof and respectively connected with said fluid-operated actuating means; a reciprocable member; connecting means connecting said reciprocable member with said carriage means for movement therewith; a control plate removably mounted on said reciprocable member and adapted to be exchanged for another control plate, said control plate having perforations arranged in accordance with a predetermined program; a stationary sensing member slidably engaging said control plate and having a set of openings respectively communicating with said open ends of said control conduits, so that during movement of said carriage means, said reciprocable member, and said control plate said control conduits are opened by said perforations in a selected sequence in accordance with said predetermined program for actuating said control valve means and said operating means for intermittently moving said carriage and for selectively operating said movable elements in accordance with said program.

2. A machine as claimed in claim 1 and including a counterpressure roller having a series of circumferential grooves, said counterpressure roller being located on one side of said control plate and opposite said sensing member, said sensing member being located on the other side of said control plate, each of said openings in said sensing member being located opposite one of said grooves of said counterpressure roller so that fluid passing through said open ends of said control conduits and through perforations in said control plate passes through the respective grooves in said counterpressure roller.

3. In an accounting machine, in combination, a plurality of movable elements, one of said movable elements being a carriage means adapted to cooperate with printing means and the other movable elements being adapted to actuate movable parts of the machine for effecting actuation of computing means and storage means; fluid-operated operating means connected to each of said movable elements for moving the same; a source of fluid having non-atmospheric pressure; operating conduit means for connecting said source of fluid with said fluid-operated operating means and including at least one pressure chamber means and a plurality of operating conduits respectively connected with said fluid-operated operating means; a plurality of control valve means in said operating conduits, respectively, each control valve means being movable between a first position connecting said pressure chamber means with the respective operating conduit and a second position connecting the respective operating conduit and the respective fluid-operated operating means with the atmosphere; a plurality of fluid-operated actuating means respectively operatively connected with said control valve means for actuating the same; control conduit means including ducts for connecting the interior of said pressure chamber means with said fluid-operated actuating means and a plurality of control conduits open at one end thereof and respectively connected with said fluid-operated actuating means; a reciprocable member; connecting means connecting said reciprocable member with said carriage means for movement therewith; a series of control plates arranged in end-to-end relationship to form a band, each control plate having perforations arranged in accordance with a predetermined program; a pair of reels mounted on said frame and supporting said band of control plates so that each of said control plates is movable to an operative position located between said reels; a stationary sensing member slidably engaging the control plate which is in said operative position and having a set of openings respectively communicating with said open ends of said control conduits, so that during movement of said carriage means, said reciprocable member, and said control plate said control conduits are opened by said perforations in a selected sequence in accordance with said predetermined program for actuating said control valve means and said operating means for intermittently moving said carriage and for selectively operating said movable elements in accordance with said program.

4. In an accounting machine, in combination, a plurality of movable elements, one of said movable elements being a carriage means adapted to cooperate with printing means and the other movable elements being adapted to actuate movable parts of the machine for effecting actuation of computing means and storage means; fluid-operated operating means connected to each of said movable elements for moving the same; a source of fluid having a pressure higher than atmospheric pressure; operating conduit means for connecting said source of fluid with said fluid-operated operating means and including at least one pressure chamber means and a plurality of operating conduits respectively connected with said fluid-operated operating means; a plurality of control valve means in said operating conduits, respectively, each control valve means being movable between a first position connecting said pressure chamber means with the respective operating conduit and a second position connecting the respective operating conduit and the respective fluid-operated operating means with the atmosphere; a plurality of resilient collapsible cylinders respectively operatively connected with said control valve means and being located in said pressure chamber means; control conduit means including a plurality of control conduits open at one end thereof and communicating at the other end thereof with the interior of said collapsible cylinders, said control conduit means including ducts respectively connecting the interior of said pressure chamber means with said control conduits; a reciprocable member; connecting means connecting said reciprocable member with said carriage means for movement therewith; a control plate removably mounted on said reciprocable member and adapted to be exchanged for another control plate, said control plate having perforations arranged in accordance with a predetermined program; a stationary sensing member slidably engaging said control plate and having a set of openings respectively communicating with said open ends of said control conduits, so that during movement of said carriage means, said reciprocable member, and said control plate said control conduits are opened by said perforations in a selected sequence in accordance with said predetermined program for actuating said control valve means and said operating means for intermittently moving said carriage and for selectively operating said movable elements in accordance with said program.

5. A business machine as set forth in claim 1 and including a tabulator bar mounted on said carriage means; a plurality of tabulator stops mounted on said tabulator bar; a stationary stop lever cooperating with said tabulator stops and being movable between a stop engaging position and a releasing position; and means actuated by one of said other movable elements and connected to the stop lever for moving the same between said positions of the same.

6. An arrangement as claimed in claim 5 and including a branch conduit communicating with the control conduit connected with the one of said fluid-operated means which moves said one other movable element; and valve means for opening and closing said branch conduit independently of said control plate.

7. An arrangement as claimed in claim 1 including a motor; a drive shaft for operating parts of the machine; coupling means for connecting said motor with said drive shaft and being movable between a coupling position and a disconnecting position, said coupling means tending to assume said coupling position; a detent lever movable between a holding position holding said coupling means in said disconnecting position and a releasing position, said detent lever being connected to one of said other movable elements to be moved by the same to said releasing position in accordance with the program on said control plate.

8. In an accounting machine, in combination, a plurality of movable elements, one of said movable elements being a carriage means adapted to cooperate with printing means and the other movable elements being adapted to actuate movable parts of the machine for effecting actuation of computing means and storage means; a platen turnably mounted on said carriage means; line shifting means connected to said platen for turning the same in a stepwise motion, said line shifting means being operatively connected to one of said other movable elements to be actuated in accordance with the program on said control plate; fluid-operated operating means connected to each of said movable elements for moving the same; a source of fluid having nonatmospheric pressure; operating conduit means for connecting said source of fluid with said fluid-operated operating means and including at least one pressure chamber means and a plurality of operating conduits respectively connected with said fluid-operated operating means; a plurality of control valve means in said operating conduits, respectively, each control valve means being movable between a first position connecting said pressure chamber means with the respective operating conduit and a second position connecting the respective operating conduit and the respective fluid-operated operating means with the atmosphere; a plurality of fluid-operated actuating means respectively operatively connected with said control valve means for actuating the same; control conduit means including ducts for connecting the interior of said pressure chamber means with said fluid-operated actuating means and a plurality of control conduits open at one end thereof and respectively connected with said fluid-operated actuating means; a reciprocable member; connecting means connecting said reciprocable member with said carriage means for movement therewith; a control plate removably mounted on said reciprocable member and adapted to be exchanged for another control plate, said control plate having perforations arranged in accordance with a predetermined program; a stationary sensing member slidably engaging said control plate and having a set of openings respectively communicating with said open ends of said control conduits, so that during movement of said carriage means, said reciprocable member, and said control plate said control conduits are opened by said perforations in a selected sequence in accordance with said predetermined program for actuating said control valve means and said operating means for intermittently moving said carriage and for selectively operating said movable elements in accordance with said program and for operating said line shifting means.

9. In an accounting machine, in combination, a plurality of movable elements; a carriage means connected to a first element of said movable elements to be reciprocated by the same; a turnable platen on said carriage means; line shifting means connected to a second element of said movable elements and actuated by the same; tabulator means for stopping said carriage means in selected positions during movement of said carriage means in one direction of reciprocation, said tabulator means being connected to a third element of said movable elements and being actuated by the same; computer means connected to at least one fourth element of said movable elements and being actuated by the same; fluid-operated operating means connected to each of said movable elements for moving the same; a source of fluid having non-atmospheric pressure; operating conduit means for connecting said source of fluid with said fluid-operated operating means and including at least one pressure chamber means and a plurality of operating conduits respectively connected with said fluid-operated operating means; a plurality of control valve means in said operating conduits, each control valve means being movable between a first position connecting said pressure chamber means with the respective operating conduit and a second position connecting the respective operating conduit and the respective fluid-operated operating means with the atmosphere; a plurality of fluid-operated actuating means respectively operatively connected with said control valve means for actuating the same; control conduit means including ducts for connecting the interior of said pressure chamber means with said fluid-operated actuating means and a plurality of control conduits open at one end thereof and respectively connected with said fluid-operated actuating means; a reciprocable member; connecting means connecting said reciprocable member with said carriage means for movement therewith; a control plate removably mounted on said reciprocable member and adapted to be exchanged for another control plate, said control plate having perforations arranged in accordance with a predetermined program; a stationary sensing member slidably engaging said control plate and having a set of openings respectively communicating with said open ends of said control conduits, so that during movement of said carriage means, said reciprocable member, and said control plate said control conduits are opened by said perforations in a selected sequence in accordance with said predetermined program for actuating said control valves and said operating members whereby said first, second, third and fourth elements of said movable elements are operated and actuate, respectively, said carriage means, line shifting means, tabulator means and computer means in a sequence determined by said program.

10. In an accounting machine, in combination, a carriage means adapted to cooperate with printing means and being mounted for movement between two end positions; first pneumatic operating means connected to said carriage means for moving the same in one direction; second pneumatic operating means connected to said carriage means for moving the same in the opposite direction; a first pressure chamber means; a source of compressed air connected to said pressure chamber means; first and second operating conduit means respectively connecting said first pressure chamber means with said first and second pneumatic operating means; first and second control valve means located in said first and second operating conduit means, respectively, each of said first and second control valve means being movable between a first position connecting said first pressure chamber means with the respective operating conduit means and a second position connecting the respective operating conduit means with the atmosphere; first and second pneumatic actuating means respectively operatively connected with first and second control valve means for actuating the same; control conduit means including ducts for connecting said first pressure chamber means with said first pneumatic actuating means, and two control conduits open at one end thereof; a connecting conduit means connecting said second pneumatic actuating means with said first operating conduit means so that said second control valve means connects said second operating conduit means with the atmosphere when said first control valve means connects said first operating conduit means with said first pressure chamber means; a reciprocable control plate having perforations arranged in accordance with a predetermined program and being connected with said carriage means for movement therewith; and a stationary sensing member slidably engaging said control plate and having a set of openings respectively communicating with said open ends of said control conduits; a second pressure chamber means communicating with said second operating conduit means so as to receive pressure air when said second pneumatic operating means is connected with said first pressure chamber means; a plurality of movable elements adapted to operate parts of the machine for effecting actuation of computing means and storage means; a plurality of auxiliary pneumatic operating means for operating said movable elements; auxiliary pneumatic actuating means respectively operatively connected with said auxiliary pneumatic operating means and being controlled by the pressure in said second pressure chamber means, each of said auxiliary pneumatic actuating means being connected to an opening in said sensing member so that said movable elements are moved in accordance with the predetermined program of said control plate only during movement of said carriage means in one direction.

11. A machine as set forth in claim 10, and including line shifting means connected to one of said movable elements and being operated by the same; a turnable platen mounted on said carriage means and operated by the line shifting means; tabulator means for stopping said carriage means in intermediate positions, said tabulator means being connected to and operated by another element of said movable elements; computer means connected to and operated by a further element of said movable elements; a motor; a drive shaft including cam means for actuating parts of the machine; coupling means for connecting said drive shaft with said motor, said coupling means being connected to and operated by one element of said movable elements.

References Cited in the file of this patent

UNITED STATES PATENTS

| | | |
|---|---|---|
| 995,135 | Harris | June 13, 1911 |
| 1,079,963 | Vogel | Dec. 2, 1913 |
| 1,080,595 | Schwertner | Dec. 9, 1913 |
| 1,238,065 | Main | Aug. 21, 1917 |
| 1,851,502 | Ferris | Mar. 29, 1932 |
| 1,985,589 | Ter Meer | Dec. 25, 1934 |
| 2,157,367 | Warner | May 9, 1939 |
| 2,504,013 | Ellis | Apr. 11, 1950 |
| 2,629,549 | Butler | Feb. 24, 1953 |
| 2,661,154 | Carlson | Dec. 1, 1953 |
| 2,800,539 | Edminster et al. | July 23, 1957 |